(12) United States Patent
Pape et al.

(10) Patent No.: US 11,760,140 B2
(45) Date of Patent: Sep. 19, 2023

(54) MECHANICALLY OSCILLATED METHOD FOR TESTING THE TIRE PRESSURE OF A VEHICLE

(71) Applicant: ZF Friedrichshafen AG, Friedrichshafen (DE)

(72) Inventors: Dennis Pape, Ostercappeln (DE); Peter Hofmann, Gilching (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 57 days.

(21) Appl. No.: 17/622,524

(22) PCT Filed: Mar. 5, 2020

(86) PCT No.: PCT/EP2020/055798
§ 371 (c)(1),
(2) Date: Dec. 23, 2021

(87) PCT Pub. No.: WO2020/259877
PCT Pub. Date: Dec. 30, 2020

(65) Prior Publication Data
US 2022/0355628 A1 Nov. 10, 2022

(30) Foreign Application Priority Data
Jun. 25, 2019 (DE) ...................... 10 2019 209 137.7

(51) Int. Cl.
*B60C 23/06* (2006.01)
(52) U.S. Cl.
CPC ................................ *B60C 23/065* (2013.01)
(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 7,823,443 B2 | 11/2010 | Djama |
| 2005/0110622 A1* | 5/2005 | Tsai ...................... B60C 23/043 73/146 |

(Continued)

FOREIGN PATENT DOCUMENTS

| DE | 40 09 540 A1 | 9/1991 |
| DE | 40 14 876 A1 | 11/1991 |

(Continued)

OTHER PUBLICATIONS

Reina et al., "Tyre Pressure Monitoring Using a Dynamical Model-Based Estimator", International Journal of Vehicle Mechanics and Mobility, vol. 53, Feb. 16, 2015, Issue 4, pp. 568-586.

(Continued)

*Primary Examiner* — Andre J Allen
(74) *Attorney, Agent, or Firm* — Finch & Maloney PLLC

(57) ABSTRACT

A method for checking the tire pressure of a vehicle (1), which vehicle comprises at least one vehicle wheel (3) and a vehicle body (2) which is supported elastically on the vehicle wheel (3). The wheel includes a tire (7), filled with gas, on which wheel the vehicle stands on a subsurface (8). The vehicle body (2) is loaded with an additional mass and thereby the vehicle body is stimulated into a mechanical oscillation (16) relative to the subsurface (8). A response signal (A), that characterizes the mechanical oscillation (16), is measured and analyzed, whereby at least one response value that characterizes the current gas pressure in the tire is determined.

10 Claims, 2 Drawing Sheets

(58) Field of Classification Search
CPC . B60C 23/0433; B60C 23/0493; B60C 19/00; B60C 23/04; B60C 23/041; B60C 23/20; B60C 23/0411; B60C 23/0462; B60C 23/0444; B60C 11/24; B60C 23/0479; B60C 26/064; B60C 23/007; B60C 23/062; B60C 23/0488; B60C 23/0401; B60C 23/0413; B60C 23/06; B60C 23/043; B60C 23/0452; B60C 11/246; B60C 23/0467; B60C 23/0498; B60C 23/02; B60C 99/006; B60C 23/0428; B60C 23/0442; B60C 2019/004; B60C 23/009; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0454; B60C 23/0455; B60C 23/0483; B60C 23/0461; B60C 23/0474; B60C 23/0415; B60C 23/0489; B60C 23/0491; B60C 25/002; B60C 29/064; B60C 23/00363; B60C 23/0481; B60C 11/0318; B60C 23/0459; B60C 23/0471; B60C 2019/005; B60C 23/002; B60C 23/042; B60C 2200/02; B60C 23/0422; B60C 23/0423; B60C 23/0466; B60C 23/0477; B60C 13/001; B60C 23/0405; B60C 29/06; B60C 23/0437; B60C 23/0476; B60C 25/132; B60C 23/0449; B60C 23/0427; B60C 25/00; B60C 9/18; B60C 23/0484; B60C 23/0486; B60C 13/00; B60C 19/003; B60C 23/065; B60C 23/00336; B60C 23/08; B60C 17/00; B60C 2019/006; B60C 23/001; B60C 23/00345; B60C 25/142; B60C 17/02; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 99/00; B60C 11/03; B60C 23/005; B60C 23/0432; B60C 25/007; B60C 3/00; B60C 5/14; B60C 11/11; B60C 17/04; B60C 17/06; B60C 23/063; B60C 23/10; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 15/06; B60C 25/056; B60C 29/005; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 2015/0617; B60C 2015/0678; B60C 2200/04; B60C 23/085; B60C 25/0548; B60C 25/185; B60C 7/107; B60C 9/22

USPC .................................................. 73/146–146.8

See application file for complete search history.

(56) References Cited

U.S. PATENT DOCUMENTS

| | | | | |
|---|---|---|---|---|
| 2006/0217864 | A1* | 9/2006 | Johnson | B60R 21/0152 701/45 |
| 2007/0085697 | A1* | 4/2007 | Breed | H04Q 9/00 340/4.62 |
| 2008/0157940 | A1* | 7/2008 | Breed | H01Q 7/00 340/425.5 |
| 2015/0247775 | A1* | 9/2015 | Kanenari | B60C 23/0493 73/146.5 |
| 2016/0121668 | A1* | 5/2016 | Singh | G01M 17/007 702/42 |

FOREIGN PATENT DOCUMENTS

| | | | |
|---|---|---|---|
| DE | 43 30 617 A1 | 3/1995 | |
| DE | 197 23 037 A1 | 12/1997 | |
| DE | 100 44 128 A1 | 5/2002 | |
| EP | 3 015 841 A2 | 5/2016 | |
| EP | 3 330 106 A1 | 6/2018 | |
| FR | 3019292 A1 * | 10/2015 | ........... B60C 23/003 |

OTHER PUBLICATIONS

German Office Action Corresponding to 10 2019 209 137.7 dated Nov. 28, 2019.

International Search Report Corresponding to PCT/EP2020/055798 dated Sep. 14, 2020.

Written Opinion Corresponding to PCT/EP2020/055798 dated Sep. 14, 2020.

* cited by examiner

MECHANICALLY OSCILLATED METHOD FOR TESTING THE TIRE PRESSURE OF A VEHICLE

This application is a National Stage completion of International Application No. PCT/EP2020/055798 filed Mar. 5, 2020, which claims priority from German Patent Application Serial No. 10 2019 209 137.7 filed Jun. 25, 2019.

FIELD OF THE INVENTION

The invention relates to a method for checking the tire pressure of a vehicle which comprises at least one vehicle wheel and a vehicle body which is elastically supported on the vehicle wheel, which wheel has a gas-filled tire and is standing with it on a subsurface.

BACKGROUND OF THE INVENTION

When a motor vehicle is parked and standing still, it is only worn by aging. If the motor vehicle is to be used again, as a rule it is assumed that it will be found in the same condition as when it was previously parked. However, if a foreign body has made its way into a tire, the tire can lose pressure. Although before starting to drive, it should be checked whether the motor vehicle is roadworthy, before driving off a driver does not usually walk round the vehicle in order to note its condition. In the case of autonomous driving as well, it must be established whether or not the motor vehicle is roadworthy, for example because tires have been punctured, or tire valves are defective, or foreign bodies have penetrated into the tires, or other manipulations of the tires have taken place.

SUMMARY OF THE INVENTION

Starting from there, the purpose of the present invention is to enable the tire pressures to be checked, in particular automatically, preferably before driving begins.

This objective is achieved by a method according to the independent claim. Preferred further developments of the method are indicated in the subordinate claims and in the description that follows.

The method mentioned to begin with, for checking the tire pressure of a vehicle which comprises at least one vehicle wheel and a vehicle body which is elastically supported on the vehicle wheel, which wheel has a gas-filled tire and is standing with it on a subsurface, is in particular further developed in that:

preferably rapidly, the vehicle body is loaded with an additional mass and thereby stimulated into a mechanical oscillation, in particular vertically relative to the subsurface, and a response signal that characterizes the mechanical oscillation is measured and analyzed, preferably automatically, whereby at least one response value that characterizes the current gas pressure in the tire is determined.

The gas-filled tire constitutes an elastic element whose spring stiffness depends on the gas pressure in the tire. If the gas pressure in the tire is too low, the vehicle body oscillates, preferably in the vertical direction at a different lower frequency, for example, than if the gas pressure in the tire was sufficiently high. In particular, the natural frequency of the vehicle body changes to a higher mode. Preferably, the loading of the vehicle body with the additional mass is used to stimulate the vehicle body into an oscillation and to detect its oscillation behavior. Advantageously, before starting to drive, it is analyzed whether there is too little or even no gas pressure in the tire, in particular without starting the motor and/or without having to move the vehicle.

The gas pressure in the tire corresponds, in particular, to the pressure of the gas in the tire. For example, the gas pressure is also called the tire pressure. Preferably, a preferably predetermined reference pressure is associated with the tire. The reference pressure corresponds to a gas pressure at which, in particular, the vehicle is roadworthy. The gas is preferably air. In particular, the vehicle is a motor vehicle.

Preferably, the loading of the vehicle body with the additional mass and the measurement and analysis of the response signal takes place each time before driving begins and/or when the vehicle is at rest. Advantageously, the method is carried out while the vehicle is at a standstill. Preferably, the method is carried out repeatedly. Preferably, the loading of the vehicle body with the additional mass takes place when a person gets into and/or sits in the vehicle. The person is, in particular, an occupant of the vehicle and/or the driver or a driver. Advantageously, the additional mass is the mass and/or weight of the said person. Preferably, the vehicle body is supported elastically on the vehicle wheel by means of a vehicle spring, or at least one vehicle spring.

According to a further development, the vehicle has a passenger compartment. Preferably, at least one vehicle seat is provided in the passenger compartment. The entry into and/or seating of the person in the vehicle means, in particular, that the person gets into the passenger compartment and/or takes his place on the vehicle seat.

Preferably, the preferably vertical mechanical oscillation is determined by a resonance of the first order due to the mass of the vehicle body and due to the preferably vertical spring stiffness of the vehicle spring which is, for example, a spiral spring. Depending on the type of vehicle, the resonance frequency is as a rule in the lower single-digit range, for example between 1 and 3 Hz. The preferably vertical spring stiffness of the tire is preferably one to two powers of ten higher than the preferably vertical spring stiffness of the vehicle spring. Thus, with a low gas pressure there is, in particular, a high order of the resonance shift.

According to an embodiment, the at least one response value is compared with at least one preferably predetermined reference value which is, in particular, associated with the specified reference pressure, or with a preferably specified reference pressure of the gas. From the comparison of the at least one response value with the at least one reference value, it can be determined, for example, whether or not the tire pressure is sufficient for roadworthiness. Preferably, the at least one reference value characterizes the reference pressure, or a reference pressure of the gas. In particular, the tire is roadworthy when the gas pressure corresponds to the reference pressure or is not different from the reference pressure by more than specified tolerance limits.

Preferably, the tire pressure and/or the roadworthiness of the tire is determined from the comparison of the at least one response value with the at least one reference value. Preferably, a divergence and/or difference between the at least one response value and the at least one reference value characterizes a divergence of the current gas pressure from the reference pressure and thus, in particular, the roadworthiness of the tire. Advantageously, the at least one response value characterizes the oscillation behavior of the vehicle body and/or that of the tire, which, in particular, depends on the gas pressure. Preferably, the at least one reference value characterizes the oscillation behavior of the vehicle body and/or that of the tire when the gas pressure corresponds to the reference pressure.

In a further development, at the reference pressure of the gas:

the vehicle body is loaded, preferably abruptly, with a reference additional mass and thereby stimulated into a mechanical reference oscillation, in particular, vertically relative to the subsurface, and a reference response signal that characterizes the mechanical reference oscillation is measured and analyzed, preferably automatically, whereby the at least one reference value is determined. Preferably, the reference additional mass matches the additional mass, or approximately so.

Preferably, the at least one response value forms or includes a frequency value, or at least one frequency value which is, in particular, characteristic of the oscillation behavior of the vehicle body and/or the tire. Preferably, the at least one response value and/or the at least one frequency value characterizes a frequency, or at least one frequency, that characterizes the oscillation behavior of the vehicle body and/or the tire. Advantageously, the at least one response value and/or the at least one frequency value characterizes a natural frequency, or at least one natural frequency of the vehicle body and/or the tire. In that case the frequency value, or the at least one frequency value, constitutes a natural frequency value, for example, or at least one natural frequency value.

Preferably, the at least one reference value is or includes a reference frequency value, or at least one reference frequency value which, in particular, characterizes the oscillation behavior of the vehicle body and/or the tire when the gas is at the reference pressure. Preferably, the at least one reference value and/or the at least one reference frequency value characterizes a frequency or at least one frequency that is characteristic of the oscillation behavior of the vehicle body and/or the tire when the gas is at the reference pressure. Advantageously, the at least one reference value and/or the reference frequency value characterizes a natural frequency, or at least one natural frequency of the vehicle body and/or the tire when the gas is at the reference pressure. In that case, the reference frequency value, or the at least one reference frequency value, forms a reference natural frequency value, or at least one reference natural frequency value. In particular, when the gas is at the reference pressure the vehicle body and/or the tire oscillates at a different frequency than when there is no gas pressure, or a gas pressure that is too low, or a different gas pressure.

According to an embodiment, in the analysis of the response signal, the response signal or a signal derived from it is transformed in the frequency range. Preferably, in the analysis of the response signal, the said response signal or the, or a, signal derived from it, is transformed in the frequency range by Fourier transformation or by discrete Fourier transformation (DFT). The discrete Fourier transformation is, in particular, a fast Fourier transformation (FFT).

Preferably, the at least one response value is or includes a value, or at least one value from the spectrum of the response signal. Preferably, the at least one response value is or will be associated with an in particular relative or absolute maximum, or at least one, in particular, relative or absolute maximum, in the spectrum of the response signal. Advantageously, the at least one response value is or includes an amplitude value, or at least one amplitude value, in the spectrum of the response signal, which is preferably associated with the maximum, or the at least one maximum.

In addition or alternatively, the at least one response value is or includes for example a frequency value, or at least one frequency value, in the spectrum of the response signal, which is preferably associated with the maximum or the at least one maximum.

In an embodiment, the at least one response value includes a plurality of response values. Moreover, the at least one, in particular specified, reference value preferably includes a plurality of in particular specified reference values. In this case the comparison of the at least one response value with the at least one reference value takes place, in particular, in that the response values are compared with the at least one reference value or with the reference values. Preferably, from the comparison of at least one of the response values with the at least one reference value or with at least one of the reference values, the tire pressure and/or the roadworthiness of the tire is determined. In particular the divergence, or a divergence, and/or the difference, or a difference, between at least one of the response values and the at least one reference value or at least one of the reference values, characterizes a deviation of the current gas pressure from the reference pressure and thus, in particular, characterizes the roadworthiness of the tire.

According to a further development, the at least one response value is or includes, and/or the response values are or include, one or more response value tuples which, or each of which, include(s) a frequency value and an amplitude value associated therewith from the spectrum of the response signal. Preferably the response value tuple, or each response value tuple and/or its values, represent an in particular relative or absolute maximum in the spectrum of the response signal. Advantageously, the frequency value of the response value tuple, or of each response value tuple, represents a natural frequency, or at least one natural frequency of the vehicle body and/or the tire. The, or each response value tuple is preferably a 2-tuple and is, for example, also called a response value pair.

In an embodiment, the at least one reference value and/or the reference values is/are or include(s) one or at least one reference value tuple. The at least one reference value and/or the reference value tuple, or the at least one reference value tuple, in particular includes a frequency value and an amplitude value associated with it. The frequency value of the at least one reference value and/or of the reference value tuple, or the at least one reference value tuple, is also called for example the reference frequency value. Moreover, the amplitude value of the at least one reference value and/or of the reference value tuple, or the at least one reference value tuple, is also called the reference amplitude value. The frequency value and the amplitude value of the at least one reference value and/or the reference value tuple, or the at least one reference value tuple, are, in particular, values from the reference response signal, or from a spectrum of the reference response signal.

Preferably the reference value tuple, or the at least one reference value tuple and/or its values represent, in particular, a relative or absolute maximum or at least one relative or absolute maximum in the spectrum of the reference response signal. Advantageously, the frequency value of the reference value tuple, or the at least one reference value tuple represents a natural frequency or at least one natural frequency of the vehicle body and/or the tire when the gas is at its reference pressure. The reference value tuple, or the at least one reference value tuple, is preferably a 2-tuple and is also called a reference value pair.

According to a further development, for the comparison of the at least one response value with the at least one reference value and/or for the comparison of the response values with the reference values, the amplitude value of the reference value tuple is compared with the amplitude value of the response value tuple or one of the response value tuples. In particular, for the comparison of the at least one response value with the at least one reference value and/or for the comparison of the response values with the reference values, the amplitude value of the reference value tuple is compared with the amplitude value of the response value tuple or one of the response value tuples, whose frequency value matches or approximately matches the frequency value of the reference value tuple and/or, for example, deviates from its frequency value by an amount within specified tolerance limits. The tolerance limits take into account, for example, a frequency deviation due to measurement errors or measurement inaccuracies and/or due to interfering variables and/or due to wear. Within the tolerance limits, the frequency value of the response tuple matches or approximately matches, in particular, the frequency value of the reference value tuple. Preferably, the divergence and/or difference between the two amplitude values compared with one another characterizes a deviation of the current gas pressure from the reference pressure and thus, in particular, characterizes the roadworthiness of the tire.

In an embodiment, for the comparison of the at least one response value with the at least one reference value, and/or for the comparison of the response values with the reference values, the frequency value of the reference value tuple is compared with the frequency value of the response value tuple or one of the response value tuples. Preferably, the divergence and/or difference between the two frequency values compared with one another characterizes a deviation of the current gas pressure from the reference pressure and thus, in particular, characterizes the roadworthiness of the tire.

According to an embodiment, a sensor or at least one sensor is provided on the vehicle body, by means of which the response signal, in particular the response signal that characterizes the mechanical oscillation, can be or is measured. The sensor, or the at least one sensor is in the form of or includes for example an acceleration sensor or at least one acceleration sensor and/or a force sensor or at least one force sensor and/or a path sensor or at least one path sensor, which latter is preferably a height level sensor. The signal or the at least one signal delivered by the acceleration sensor constitutes, for example, the response signal. Preferably, the response signal represents and/or characterizes the accelerations occurring in the vehicle body, in particular owing to the mechanical oscillation. Advantageously, the signal delivered by the acceleration sensor is an electrical signal. The signal or a signal delivered by the force signal constitutes, for example, the response signal. Preferably, the response signal represents and/or characterizes the forces occurring in the vehicle body, in particular owing to the mechanical oscillation. Advantageously, the signal delivered by the force sensor is an electrical signal. The signal or a signal delivered by the path sensor is preferably derived twice with respect to time. The signal from the path sensor, derived twice with respect to time, constitutes for example the response signal. Preferably, the response signal represents and/or characterizes the accelerations occurring in the vehicle body, in particular owing to the mechanical oscillation. Advantageously, the signal delivered by the path sensor is an electrical signal. In particular, the signal from the path sensor derived twice with respect to time is an electrical signal.

BRIEF DESCRIPTION OF THE DRAWINGS

Below, the invention is described with reference to a preferred embodiment, having regard to the drawings, which show.

DETAILED DESCRIPTION OF THE PREFERRED EMBODIMENTS

Figure 1:
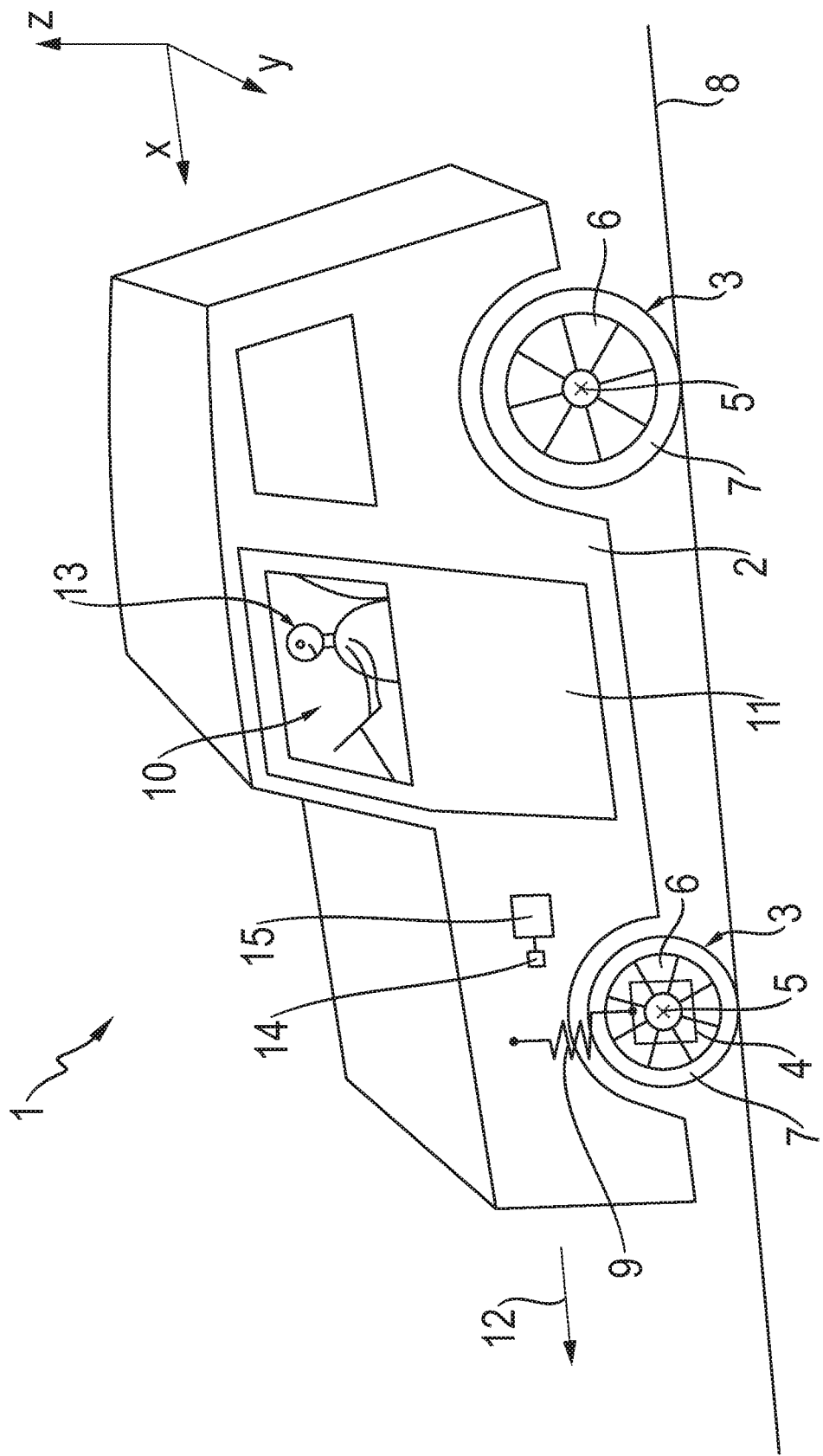
FIG. 1: A schematic representation of a vehicle with tires.

FIG. 1 shows a schematic representation of a vehicle 1 with a vehicle body (bodywork) 2 and a plurality of vehicle wheels 3, each of the latter comprising a wheel rim 6 mounted on a wheel carrier 4 to rotate about a wheel rotation axis 5 and, around the wheel rim, a tire 7 which is standing on a subsurface 8 and which is filled with a gas, the gas preferably being air. The vehicle body 2 is supported elastically by means of vehicle springs 9 on the wheel carriers 4. In addition the vehicle body 2 has a passenger compartment 10 and a vehicle door 11, by way of which access to the passenger compartment can be enabled. Associated with the vehicle 1 are a longitudinal vehicle direction x, a transverse vehicle direction y and an upward vehicle direction z, these directions x, y and z being represented schematically by a co-ordinate system. Furthermore, an arrow 12 shows the usual forward-travel direction of the vehicle 1 which, in particular, extends in the longitudinal vehicle direction x.

In FIG. 1, a person 13 can be seen in the passenger compartment 10, who is also referred to as the occupant of the vehicle. In particular, the person 13 is the driver of the vehicle 1. When the person 13 gets into the passenger compartment 10, the total weight of the vehicle body 2 increases abruptly, since the bodyweight of the person 13 is added to the weight of the vehicle body 2. Thereby, the vehicle spring 9 is abruptly compressed so that the vehicle body 2 is stimulated into a mechanical oscillation in the upward direction z of the vehicle which, depending on the design, corresponds in particular to the vertical direction. A response signal that characterizes the oscillation of the vehicle body 2 is measured by means of an acceleration sensor 14 provided in the vehicle body 2, which sensor is connected to a computer unit 15 by which, from the response signal, a response value that characterizes the oscillation behavior of the vehicle body 2 is determined and compared with at least one reference value that characterizes a corresponding oscillation when the gas in the tire 7 is at a reference pressure. If the at least one response value matches the at least one reference value within specified tolerance limits, it can be concluded that the gas pressure in the tire corresponds to the reference pressure, so that the tire is roadworthy. On the other hand, if the at least one response value differs from the at least one reference value by an amount outside the specified tolerance limits, then it can be concluded that the gas pressure in the tire does not correspond to the reference pressure so that, in particular, the tire 7 is not roadworthy.

The determination of the at least one response value preferably takes place in the frequency range. For this, the response signal is transformed into the frequency range, preferably by means of a discrete Fourier transformation, and the at least one response value is determined from the spectrum of the response signal. This will be explained in greater detail with reference to FIG. 2.

Figure 2:
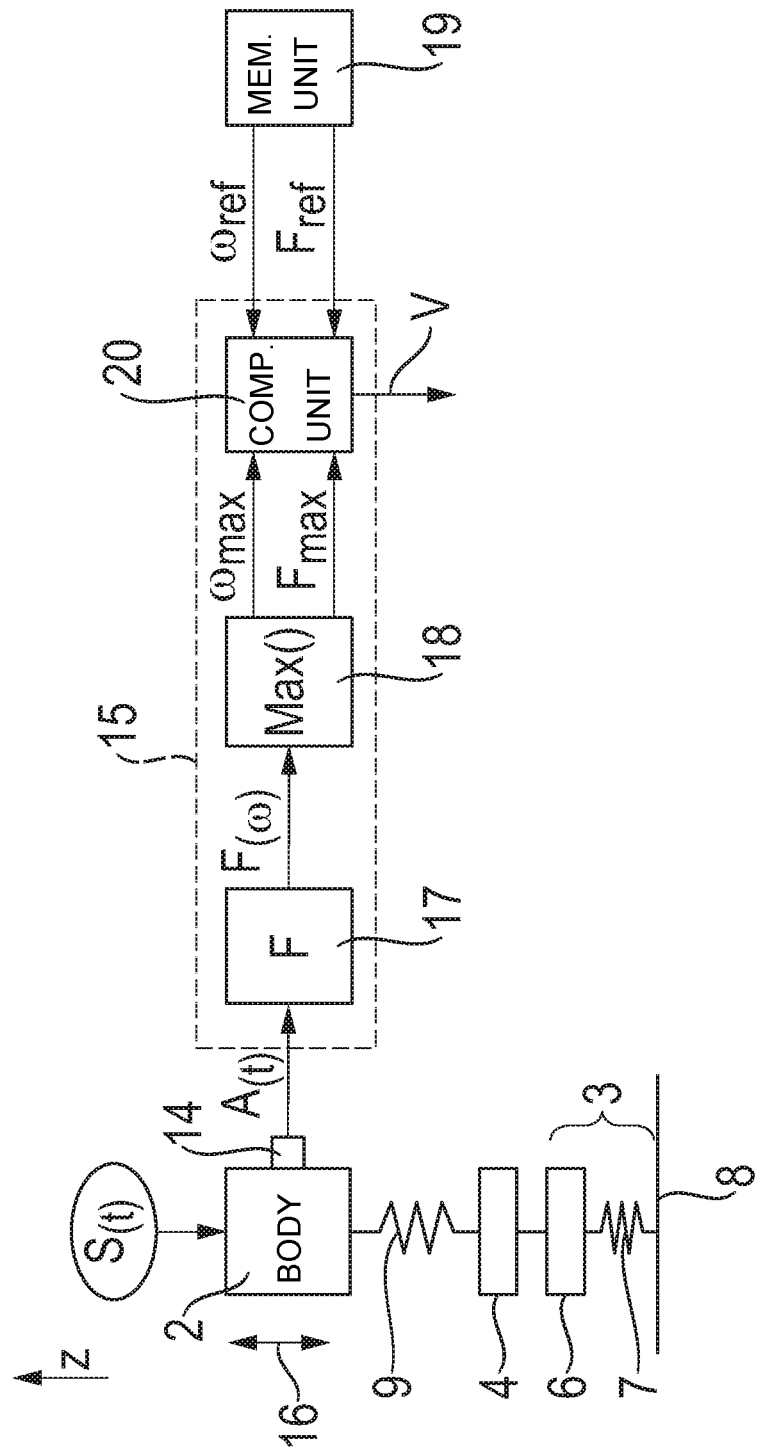
FIG. 2: A schematic flow chart to explain a method for checking the reference pressure, according to an embodiment.

In FIG. 2, the tire 7 is represented schematically as a spring between the wheel rim 6 and the subsurface 8. When the person 13 gets into the passenger compartment 10, a stimulus signal S in the form of a first bounce is initiated in the vehicle body 2, which stimulates the vehicle body 2 into a mechanical oscillation as indicated by the double arrow 16. The, or a response signal A that characterizes the oscillation is measured by the acceleration sensor 14 and sent to the computer unit 15, which contains a transformation unit 17 by means of which the response signal A is transformed, in particular, by a discrete Fourier transformation into the frequency range. The transformed response signal F describes a spectrum (frequency spectrum) and is sent to an evaluation unit 18 by means of which at least one maximum of the spectrum is determined and the associated values, which form the response values that characterize the oscillation, are determined in the form of at least one frequency value $\omega_{max}$ and at least one amplitude value $F_{max}$. Thus, the response values form or include at least one response tuple that includes a frequency value and an amplitude value. In this case, the response tuple includes, in particular, the frequency value $\omega_{max}$ and the amplitude value $F_{max}$. The computer unit 15 has access to a memory unit 19, in which reference values are stored, which include at least one reference frequency value $\omega_{ref}$ and at least one reference amplitude value $F_{ref}$ which characterize the oscillation when the gas is at its reference pressure. Thus, the reference values form or include at least one reference tuple that includes a frequency value and an amplitude value. In this case, the reference value tuple includes, in particular, the frequency value $\omega_{ref}$ and the amplitude value $F_{ref}$. The response values $\omega_{max}$ and $F_{max}$ and the reference values $\omega_{ref}$ and $F_{ref}$ are sent to a comparison unit 20 and compared with one another, after which the comparison result V, which characterizes a deviation of the current actual gas pressure from the reference pressure, is emitted.

Indexes

1 Vehicle
2 Vehicle body
3 Vehicle wheel
4 Wheel carrier
5 Wheel rotation axis
6 Wheel rim
7 Tire
8 Subsurface
9 Vehicle spring
10 Passenger compartment
11 Vehicle door
12 Travel direction
13 Person/vehicle occupant
14 Acceleration sensor
15 Computer unit
16 Oscillation
17 Transformation unit
18 Evaluation unit
19 Memory unit
20 Comparison unit x Longitudinal direction of the vehicle
y Transverse direction of the vehicle
z Vertical direction of the vehicle
A Response signal
V Comparison result

The invention claimed is:

1. A method for checking tire pressure of a vehicle, which vehicle comprises at least one vehicle wheel and a vehicle body which is supported elastically on the vehicle wheel, the wheel including a tire filled with gas and the vehicle is supported by a subsurface via the tire, the method comprising:
loading the vehicle body with an additional mass and thereby the vehicle body is stimulated into a mechanical oscillation relative to the subsurface, and
measuring and analyzing a response signal, that characterizes the mechanical oscillation so that at least one response value that characterizes a current gas pressure in the tire is determined.

2. The method according to claim 1, further comprising comparing the at least one response value with at least one predetermined reference value which is associated with a reference pressure of the gas.

3. The method according to claim 2, further comprising characterizing a deviation of the current gas pressure from the reference pressure by a difference between the at least one response value and the at least one reference value.

4. The method according to claim 2, further comprising characterizing oscillation behavior of the vehicle body, when the gas is at its reference pressure, by the at least one reference value.

5. The method according to claim 2, wherein when the gas is at the reference pressure,
loading the vehicle body with a reference additional mass and thereby stimulating the vehicle body into a reference mechanical oscillation relative to the subsurface, and
measuring and analyzing a reference response signal that characterizes the reference mechanical oscillation so that the at least one reference value is determined.

6. The method according to claim 1, further comprising, for analyzing the response signal, transforming the response signal or a signal derived therefrom into a frequency range, and the at least one response value forms at least one value from a spectrum of the response signal.

7. The method according to claim 6, further comprising associating the at least one response value with at least one maximum in the spectrum of the response signal.

8. The method according to claim 6, further comprising including an amplitude value in the spectrum of the response signal and/or at least one frequency value in the spectrum of the response signal for the at least one response value.

9. The method according to claim 1, further comprising providing at least one acceleration sensor, in the vehicle body, by which the response signal is measured, which signal represents accelerations occurring in the vehicle body.

10. The method according to claim 1, further comprising loading the vehicle body with the additional mass occurs when a person gets into the vehicle.

* * * * *